No. 638,795.　　　　　　　　　　　　　　　Patented Dec. 12, 1899.
F. O. BULLIS.
GEAR WHEEL.
(Application filed Jan. 14, 1899.)

(No Model.)

Witnesses
D. W. Gould.

Inventor
F. O. Bullis,
by Benj. R. Catlin
Attorney

UNITED STATES PATENT OFFICE.

FREDERICK O. BULLIS, OF ROCHESTER, NEW YORK, ASSIGNOR, BY MESNE ASSIGNMENTS, TO THE BULLIS BALL-GEAR COMPANY, OF SAME PLACE.

GEAR-WHEEL.

SPECIFICATION forming part of Letters Patent No. 638,795, dated December 12, 1899.

Application filed January 14, 1899. Serial No. 702,160. (No model.)

*To all whom it may concern:*

Be it known that I, FREDERICK O. BULLIS, a resident of Rochester, in the county of Monroe and State of New York, have invented certain new and useful Improvements in Gear-Wheels; and I do hereby declare the following to be a full, clear, and exact description of the invention, such as will enable others skilled in the art to which it pertains to make and use the same.

The invention relates to gearing, and has for its object to improve that class of gears in which spheres, spheroids, or other rollers rotating on pivots are used instead of fixed teeth to effect an engagement whereby power may be transmitted from one gear-wheel to another.

The improvement is capable of general application to gear-wheels of the character specified, but is especially adapted for gear-wheels of the bevel-gear type or those which operatively connect shafts having an angular arrangement with respect to each other and in which a variation of the angle is either desired or unavoidable.

The invention consists in the construction herein described and pointed out.

Figure 1:
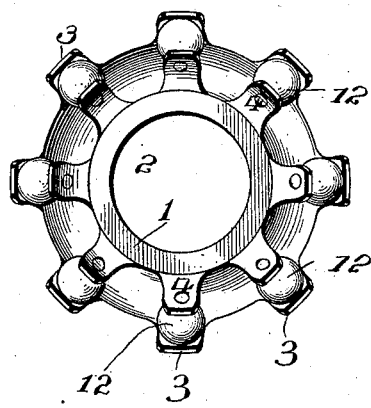
Figure 2:
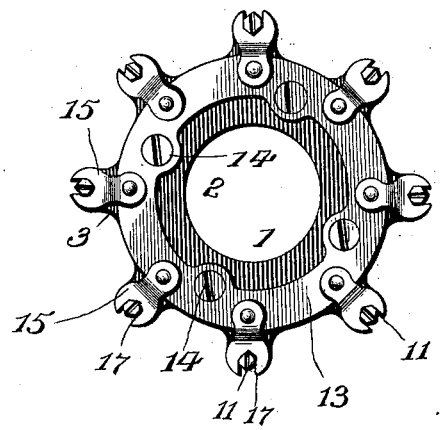
Figure 3:
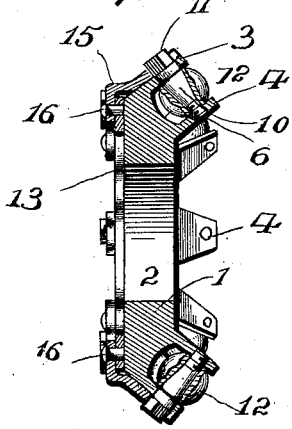
Figure 4:
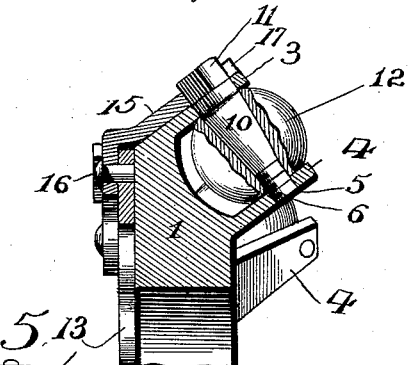

In the accompanying drawings, Figure 1 is a front view of the improved gear-wheel, the pivot-retaining means being omitted. Fig. 2 is a rear view of the same, the pivot-retaining means being in operative situation. Fig. 3 is a central section, and Fig. 4 is a partial section on an enlarged scale.

Numeral 1 denotes a gear-body having a central opening 2 to receive a shaft, as usual.

3 and 4 indicate ears or lugs fixed to the body. In the instance illustrated the lugs are inclined to the axis of the body. Each lug 4 has a screw-threaded opening 5, in which is engaged the threaded end of a screw 6. Said screw 6 has a cylindrical neck 8, fitted in an unthreaded opening in the lug 3. It also has a frusto-conical body 10, intermediate the lugs, and an angular head 11, preferably provided with a kerf.

12 12 denote spheres mounted on the pivots between the lugs 3 and 4. Each sphere has an axial or diametric opening similar in form to the pivot-body, upon which body the ball is fitted and about which it is free to rotate.

13 denotes an annular plate secured to the gear-body in any suitable manner, as by screws 14. Its office is to furnish support for a series of spring pivot-locks 15, which may be fixed to it by rivets 16 or in any desired way. The annular plate 13 is not essential, though it provides a suitable and convenient support for the pivot-locks. The springs or locks, bent as shown, are provided with slots 17, adapted to receive the angular pivot-heads 11. This construction prevents the pivot from turning while its head is held in a slot, as it otherwise would do under the influence of the rotating ball.

Balls or similar rollers rotatably mounted on pivots and used in gear-wheels of either the bevel, spur, or crown type become loose upon their pivots after a moderate length of use. This permits a play between the balls themselves and between the balls and pivots, which increases rapidly the wear of the parts. To compensate for such wear, the pivots or any of them can be screwed into lug 4 and the body of each pivot thus adjusted or freshly fitted to the ball-opening. To effect this, the pivot-lock is sprung away from the pivot-head and the pivot is set up or screwed home, either by a screw-driver or a wrench, whereupon the spring-plate can be again secured upon the pivot-head to hold it from turning. Other locking devices are not excluded, though the form described is preferred.

Figure 5:
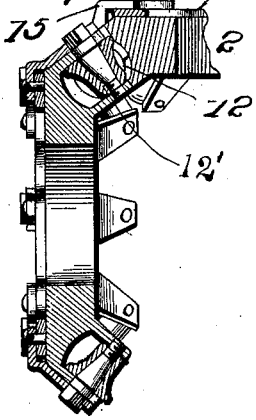

In Fig. 5 are shown rotary members provided one with balls 12 and the other with spools 12'. These are arranged at equal distances apart around the peripheries of the respective rotary members and are adapted to mesh in manner to transmit power. The spools have each a circumferential groove to fit the balls, said spools being wider—that is, having a greater diameter on the outside of the plane passing transversely through the spool and through the center of the contiguous ball.

Having thus described my invention, I claim—

1. A gear-wheel body, rollers adapted to act as gear-teeth rotatably mounted on pivots supported in lugs fixed to the body, said pivots having each a frusto-conical body and a screw-threaded end engaging a threaded opening in a lug, and the rollers having similarly-shaped openings whereby they fit said pivot-bodies.

2. A gear-wheel body, rollers adapted to act as gear-teeth rotatably mounted on pivots supported in lugs fixed to the body, said pivots having each a frusto-conical body and a screw-threaded end engaging a threaded opening in a lug, and the rollers having similarly-shaped openings whereby they fit said pivot-bodies and spring pivot-locks to prevent, when desired, the screwing of the pivots through the lugs having a screw-threaded opening.

3. In a gear-wheel comprising roller-teeth, a pivot for each roller having a frusto-conical body fitting a similarly-shaped opening in the roller and means for setting up the pivot to compensate for wear.

4. The combination of a gear-wheel having convex-surfaced roller-teeth with a gear-wheel having concave-surfaced roller-teeth said convex rollers meshing with the concave rollers.

5. The combination of a gear-wheel having convexed-surfaced roller-teeth with a gear-wheel having concave-surfaced roller-teeth said convex rollers meshing with the concave rollers and means for setting the rollers together endwise their pivots.

6. In ball-gearing, the combination of a rotary member provided with a series of balls arranged at equal distances apart around its periphery, with another rotary member provided with a corresponding series of spools, each having a circumferential groove adapted to fit the balls, said spools being wider on the outside of the central line of the balls, as and for the purposes set forth.

In testimony whereof I have signed this specification in the presence of two subscribing witnesses.

FREDERICK O. BULLIS.

Witnesses:
BENJ. R. CATLIN,
G. W. BALLOCH.